US010915938B2

(12) United States Patent
Greenberger et al.

(10) Patent No.: US 10,915,938 B2
(45) Date of Patent: Feb. 9, 2021

(54) INCLUDING INSTRUCTIONS UPON ITEM PROCUREMENT

(71) Applicant: International Business Machines Corporation, Armonk, NY (US)

(72) Inventors: Jeremy A. Greenberger, San Jose, CA (US); Lisa Seacat DeLuca, Baltimore, MD (US); Kelley Anders, East New Market, MD (US); Jeremy R. Fox, Georgetown, TX (US)

(73) Assignee: International Business Machines Corporation, Armonk, NY (US)

( * ) Notice: Subject to any disclaimer, the term of this patent is extended or adjusted under 35 U.S.C. 154(b) by 326 days.

(21) Appl. No.: 15/996,835

(22) Filed: Jun. 4, 2018

(65) Prior Publication Data

US 2019/0370876 A1    Dec. 5, 2019

(51) Int. Cl.
*G06Q 30/00* (2012.01)
*G06Q 30/06* (2012.01)
*G06F 16/951* (2019.01)

(52) U.S. Cl.
CPC ....... *G06Q 30/0623* (2013.01); *G06F 16/951* (2019.01); *G06Q 30/0635* (2013.01)

(58) Field of Classification Search
CPC ................................. G06Q 30/06–08
USPC ............................. 705/26.1–27.2
See application file for complete search history.

(56) References Cited

U.S. PATENT DOCUMENTS

| 8,756,118 B1 | 6/2014 | Bernshteyn et al. |
| 9,607,327 B2 | 3/2017 | Atsmon et al. |
| 2008/0275727 A1 | 11/2008 | Koo et al. |
| 2013/0085894 A1* | 4/2013 | Chan ............ G06Q 30/02 705/26.64 |
| 2014/0249920 A1 | 9/2014 | Kerr et al. |
| 2015/0149312 A1* | 5/2015 | Cancro ............ G06Q 20/209 705/24 |
| 2017/0228739 A1 | 8/2017 | Massaroni et al. |

OTHER PUBLICATIONS

Thumma, S., "Naan recipe, video recipe, how to make Naan recipe" (www.vahvehvah.com/naan, Nov. 26, 2007, downloaded from wayback machine snapshot Aug. 11, 2016) (Year: 2016).*

* cited by examiner

*Primary Examiner* — Ethan D Civan
(74) *Attorney, Agent, or Firm* — Stephanie Carusillo; Madeline F. Schiesser; Keohane & D'Alessandro, PLLC (57) ABSTRACT

Approaches presented herein enable providing a user with a procurement context notification. More specifically, a selection of an item for procurement by a user through an e-commerce enabled website is obtained. The item, including a use for the item, is identified. A web pointer to web accessible media provided by a third party source that describes the use for the identified item is then retrieved from a browsing history of the user. A description of this web accessible media is generated based on content from the web accessible media. The description and/or the web pointer are attached to a procurement confirmation document, which is then sent to the user. The confirmation document with the attached description and web pointer can be a physical document for inclusion with a physical package containing the item to be transported to the user.

20 Claims, 4 Drawing Sheets

INCLUDING INSTRUCTIONS UPON ITEM PROCUREMENT

TECHNICAL FIELD

The present invention relates generally to e-commerce and, more specifically, to providing a user at time of delivery of an item from a vendor with the context surrounding the user's initial purchase of that item from that vendor.

BACKGROUND

The rise of online shopping has allowed consumers to directly buy goods or services from a vendor over the Internet using a web browser or dedicated application. However, as online shopping becomes more ubiquitous, websites across the Internet increasingly tend to present viewers with "buy-it-now" type links, directing the viewer to an online vendor from which the viewer can purchase the goods or services discussed on the original website. These goods or services can then be delivered directly to the customer's door (e.g., via postal mail or a courier service) or held at a local central location for procurement when convenient for the customer (e.g., in-store pick-up). Some vendors offer faster shipping speeds and/or reduced price shipping as incentives to their customers. Nevertheless, delivery of a purchased good or service to a customer, who is not in a close radius to a physical location of the vendor, generally takes at least one to several days.

SUMMARY

Approaches presented herein enable providing a user with a procurement context notification. More specifically, a selection of an item for procurement by a user through an e-commerce enabled website is obtained. The item, including a use for the item, is identified. A web pointer to web accessible media provided by a third party source that describes the use for the identified item is then retrieved from a browsing history of the user. A description of this web accessible media is generated based on content from the web accessible media. The description and/or the web pointer are attached to a procurement confirmation document, which is then sent to the user. The confirmation document with the attached description and web pointer can be a physical document for inclusion with a physical package containing the item to be transported to the user.

One aspect of the present invention includes a method for providing a user with a procurement context notification, comprising: obtaining a selection of an item for procurement by a user through an e-commerce enabled website; identifying the item including a use for the item; retrieving a web pointer to web accessible media provided by a third party source that describes the use for the identified item; generating a description for the web accessible media; attaching the description and the web pointer to a procurement confirmation document; and sending the procurement confirmation document with the attached description and web pointer to the user.

Another aspect of the present invention includes a computer system for providing a user with a procurement context notification, the computer system comprising: a memory medium comprising program instructions; a bus coupled to the memory medium; and a processor, for executing the program instructions, coupled to procurement context notification engine via the bus that when executing the program instructions causes the system to: obtain a selection of an item for procurement by a user through an e-commerce enabled website; identify the item including a use for the item; retrieve a web pointer to web accessible media provided by a third party source that describes the use for the identified item; generate a description for the web accessible media; attach the description and the web pointer to a procurement confirmation document; and send the procurement confirmation document with the attached description and web pointer to the user.

Yet another aspect of the present invention includes a computer program product for providing a user with a procurement context notification, the computer program product comprising a computer readable hardware storage device, and program instructions stored on the computer readable hardware storage device, to: obtain a selection of an item for procurement by a user through an e-commerce enabled website; identify the item including a use for the item; retrieve a web pointer to web accessible media provided by a third party source that describes the use for the identified item; generate a description for the web accessible media; attach the description and the web pointer to a procurement confirmation document; and send the procurement confirmation document with the attached description and web pointer to the user.

Still yet, any of the components of the present invention could be deployed, managed, serviced, etc., by a service provider who offers to implement passive monitoring in a computer system.

Embodiments of the present invention also provide related systems, methods, and/or program products.

BRIEF DESCRIPTION OF THE SEVERAL VIEWS OF THE DRAWINGS

These and other features of this invention will be more readily understood from the following detailed description of the various aspects of the invention taken in conjunction with the accompanying drawings in which.

The drawings are not necessarily to scale. The drawings are merely representations, not intended to portray specific parameters of the invention. The drawings are intended to depict only typical embodiments of the invention, and therefore should not be considered as limiting in scope. In the drawings, like numbering represents like elements.

DETAILED DESCRIPTION

Illustrative embodiments will now be described more fully herein with reference to the accompanying drawings, in which illustrative embodiments are shown. It will be appreciated that this disclosure may be embodied in many different forms and should not be construed as limited to the illustrative embodiments set forth herein. Rather, these embodiments are provided so that this disclosure will be thorough and complete and will fully convey the scope of this disclosure to those skilled in the art.

Furthermore, the terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. Furthermore, similar elements in different figures may be assigned similar element numbers. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Unless specifically stated otherwise, it may be appreciated that terms such as "processing," "detecting," "determining," "evaluating," "receiving," or the like, refer to the action and/or processes of a computer or computing system, or similar electronic data center device, that manipulates and/or transforms data represented as physical quantities (e.g., electronic) within the computing system's registers and/or memories into other data similarly represented as physical quantities within the computing system's memories, registers or other such information storage, transmission or viewing devices. The embodiments are not limited in this context.

As stated above, embodiments described herein enable providing a user with a procurement context notification. More specifically, a selection of an item for procurement by a user through an e-commerce enabled website is obtained. The item, including a use for the item, is identified. A web pointer to web accessible media provided by a third party source that describes the use for the identified item is then retrieved from a browsing history of the user. A description of this web accessible media is generated based on content from the web accessible media. The description and/or the web pointer are attached to a procurement confirmation document, which is then sent to the user. The confirmation document with the attached description and web pointer can be a physical document for inclusion with a physical package containing the item to be transported to the user.

Figure 1:
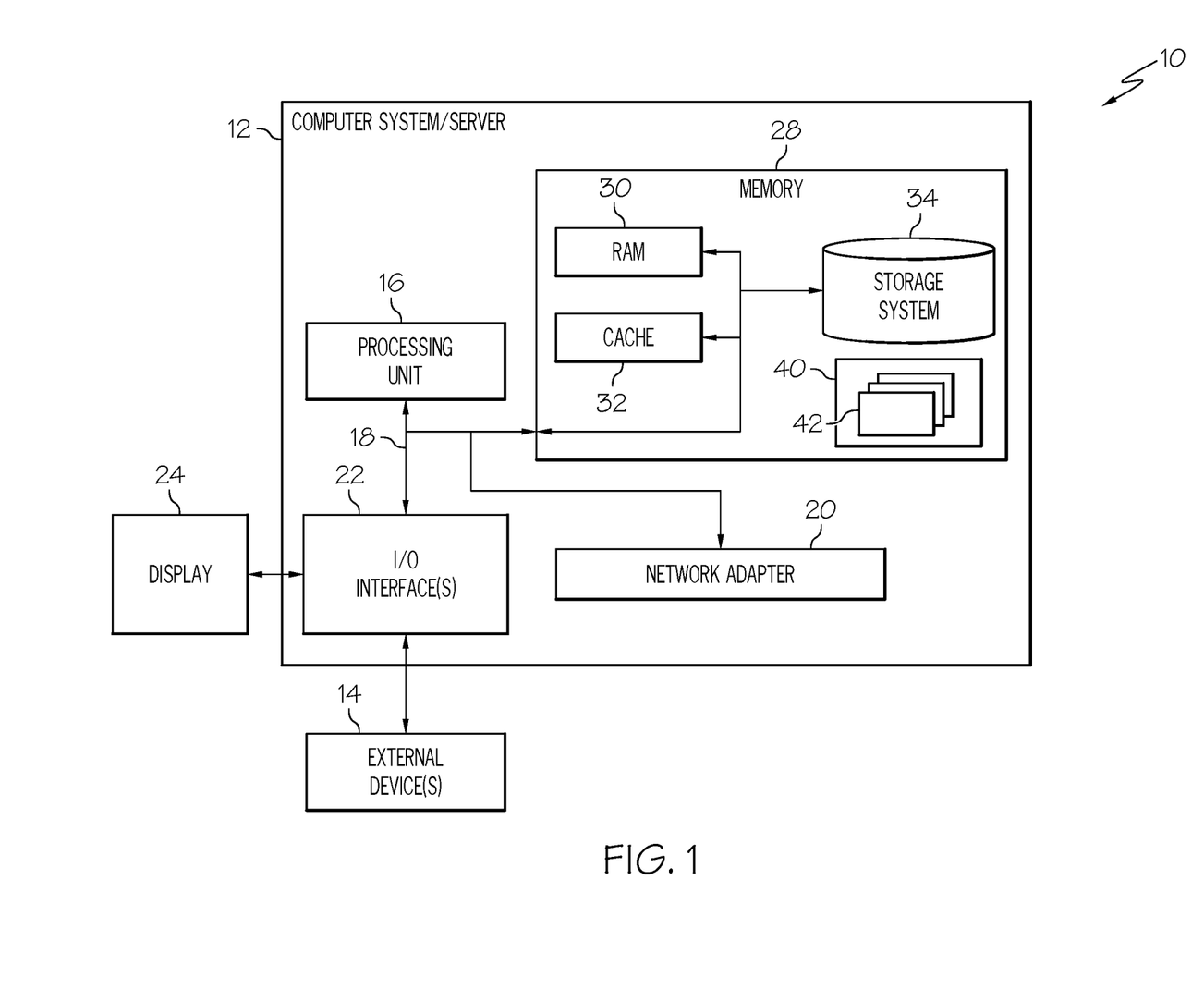
FIG. 1 shows an architecture in which the invention may be implemented according to illustrative embodiments.

Referring now to FIG. 1, a computerized implementation 10 of an embodiment for providing a user with a procurement context notification will be shown and described. Computerized implementation 10 is only one example of a suitable implementation and is not intended to suggest any limitation as to the scope of use or functionality of embodiments of the invention described herein. Regardless, computerized implementation 10 is capable of being implemented and/or performing any of the functionality set forth hereinabove.

In computerized implementation 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

This is intended to demonstrate, among other things, that the present invention could be implemented within a network environment (e.g., the Internet, a wide area network (WAN), a local area network (LAN), a virtual private network (VPN), etc.), a cloud computing environment, a cellular network, or on a stand-alone computer system. Communication throughout the network can occur via any combination of various types of communication links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer system/server 12 is intended to demonstrate that some or all of the components of implementation 10 could be deployed, managed, serviced, etc., by a service provider who offers to implement, deploy, and/or perform the functions of the present invention for others.

Computer system/server 12 is intended to represent any type of computer system that may be implemented in deploying/realizing the teachings recited herein. Computer system/server 12 may be described in the general context of computer system/server executable instructions, such as program modules, being executed by a computer system. Generally, program modules may include routines, programs, objects, components, logic, data structures, and so on, that perform particular tasks or implement particular abstract data types. In this particular example, computer system/server 12 represents an illustrative system for providing a user with a procurement context notification. It should be understood that any other computers implemented under the present invention may have different components/software, but can perform similar functions.

Computer system/server 12 in computerized implementation 10 is shown in the form of a general-purpose computing device. The components of computer system/server 12 may include, but are not limited to, one or more processors or processing units 16, a system memory 28, and a bus 18 that couples various system components including system memory 28 to processing unit 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Processing unit 16 refers, generally, to any apparatus that performs logic operations, computational tasks, control functions, etc. A processor may include one or more subsystems, components, and/or other processors. A processor will typically include various logic components that operate using a clock signal to latch data, advance logic states, synchronize computations and logic operations, and/or provide other timing functions. During operation, processing unit 16 collects and routes signals representing inputs and outputs between external devices 14 and input devices (not shown). The signals can be transmitted over a LAN and/or a WAN (e.g., T1, T3, 56 kb, X.25), broadband connections (ISDN, Frame Relay, ATM), wireless links (802.11, Bluetooth, etc.), and so on. In some embodiments, the signals may be encrypted using, for example, trusted key-pair encryption. Different systems may transmit information using different communication pathways, such as Ethernet or wireless networks, direct serial or parallel connections, USB, Firewire®, Bluetooth®, or other proprietary interfaces. (Firewire is a registered trademark of Apple Computer, Inc. Bluetooth is a registered trademark of Bluetooth Special Interest Group (SIG)).

In general, processing unit 16 executes computer program code, such as program code for providing a user with a procurement context notification, which is stored in memory 28, storage system 34, and/or program/utility 40. While executing computer program code, processing unit 16 can read and/or write data to/from memory 28, storage system 34, and program/utility 40.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media, (e.g., VCRs, DVRs, RAID arrays, USB hard drives, optical disk recorders, flash storage devices, and/or any other data processing and storage elements for storing and/or processing data). By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and/or an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation. Memory 28 may also have an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

The inventors of the present invention have found that instructional videos and other instructional media (e.g., blog posts with step-by-step pictures or descriptions) viewed online have become popular. The inventors have further found that the convenience of ordering items online has also become popular and, as a result, some instructional web media providers also provide users with links to e-commerce vendors from whom the items needed per the instructions can be purchased or otherwise obtained. Even when such links are not present, users can easily view instructional media online and then go to an e-commerce website or dedicated application and purchase the needed items. However, although online shopping offers certain conveniences, it also has the disadvantage of a delay between the time when a person decides he/she buys an item and the time when the person actually receives the item in his/her hands, which typically may be several days due to shipping time. As a result, by the time the items needed to perform the instructions arrive, the user may have forgotten what they wanted the items for or have failed to save a copy of the instructions from the instructional video/media. Information included with the purchased item is generally limited to generic product information provided by a manufacturer and is unrelated to the specific task the user wanted to perform. Therefore, the user must attempt to locate the same instructional video/media he/she last viewed at best days ago to relearn the proper context in which to use the purchased items.

Accordingly, the inventors of the present invention have developed a system that extends the online purchase experience by dynamically procuring and coupling third party instructions for the use of items purchased with the purchased items. According to embodiments of the present invention, this can be achieved via seamless delivery of the instructions along with an order transaction confirmation itself. Therefore, when a user reviews his/her receipt, whether included in a shipped package along with the purchased item or sent via an electronic communication, the user is notified of the context surrounding his/her initial purchase.

Furthermore, embodiments of the present invention offer several advantages for providing a user with a procurement context notification. For example, embodiments of the present invention enable the ability to proactively pair an online purchase with instructions or other guidance materials that are specific to the exact item being purchased and that are tailored to the particular interest that the purchaser has in the item. This enhances the efficiency of online shopping and e-commerce by permitting an item to be employed by a user right out of the box for the specific purpose that the user intended when initially making the purchase.

Figure 2:
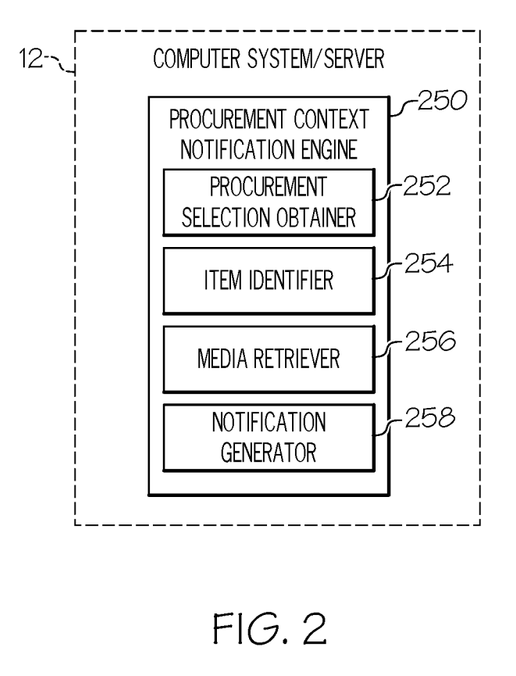
FIG. 2 shows a system diagram describing the functionality discussed herein according to illustrative embodiments.

Referring now to FIG. 2, a system diagram describing the functionality discussed herein according to an embodiment of the present invention is shown. It is understood that the teachings recited herein may be practiced within any type of computing environment, including, but not limited to, a networked computing environment (e.g., a cloud computing environment). A stand-alone computer system/server 12 is shown in FIG. 2 for illustrative purposes only. In the event the teachings recited herein are practiced in a networked computing environment, each client need not have a procurement context notification engine 250 (hereinafter "system 250"). Rather, all or part of system 250 could be loaded on a server or server-capable device that communicates (e.g., wirelessly) with the clients to provide a user with a procurement context notification. Regardless, as depicted, system 250 is shown within computer system/server 12. In general, system 250 can be implemented as program/utility 40 on computer system 12 of FIG. 1 and can enable the functions recited herein.

Along these lines, system 250 may perform multiple functions similar to a general-purpose computer. Specifically, among other functions, system 250 can provide a user with a procurement context notification in a networked computing environment. To accomplish this, system 250 can include a set of components (e.g., program modules 42 of FIG. 1) for carrying out embodiments of the present invention. These components can include, but are not limited to, procurement selection obtainer 252 for obtaining a selection of an item for procurement by a user through an e-commerce enabled website, item identifier 254 for identifying the item including a use for the item, media retriever 256 for retrieving a web pointer to web accessible media provided by a third party source that describes the use for the item and generating a description for the web accessible media, and notification generator 258 for attaching the description and the web pointer to a procurement confirmation document, and sending the procurement confirmation document with the attached description and web pointer to the user.

Figure 3:
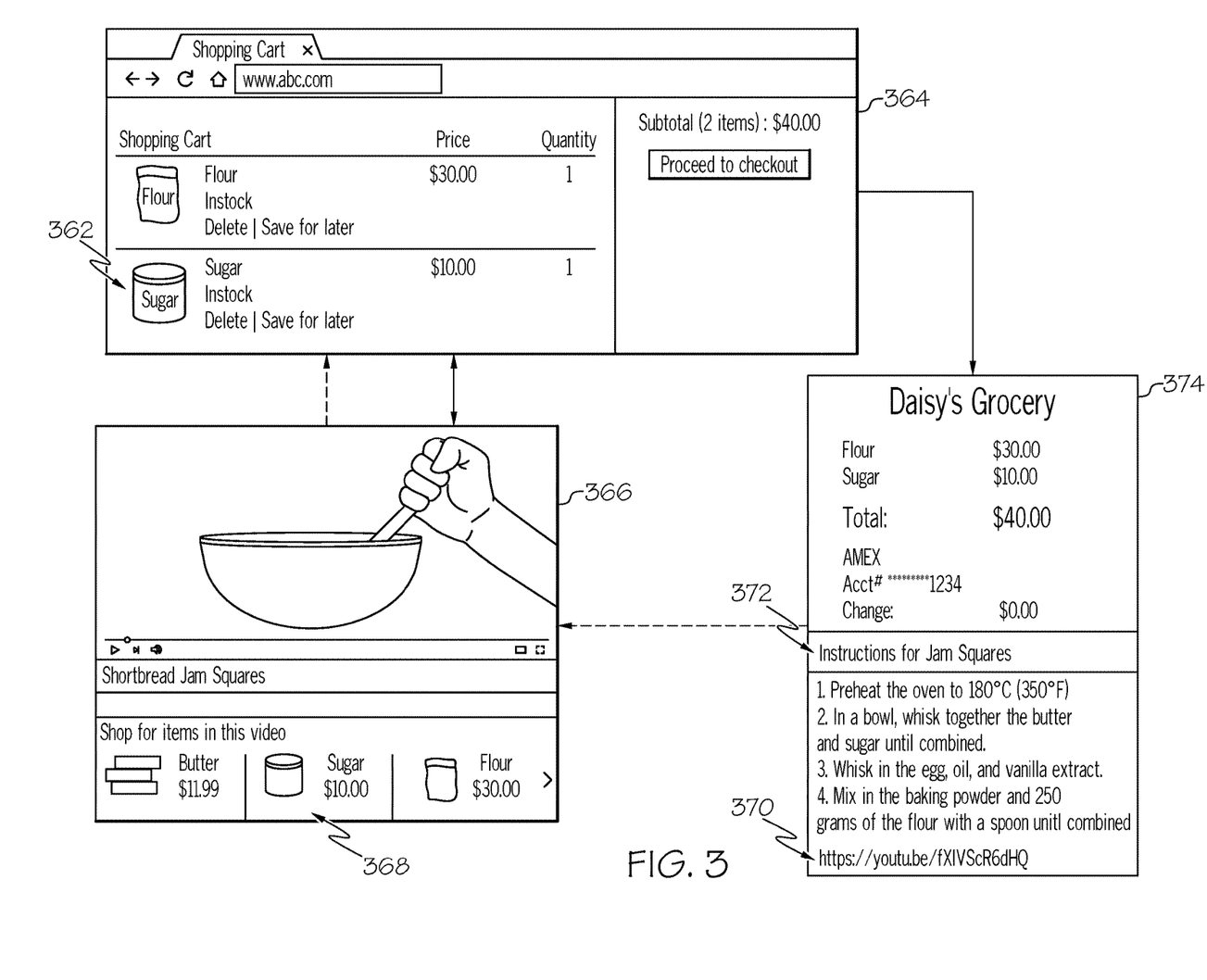
FIG. 3 shows an illustrative example of providing a user with a procurement context notification according to illustrative embodiments.

Referring now to FIG. 3 in connection with FIG. 2, an illustrative example of providing a user with a procurement context notification according to embodiments of the present invention is shown. However, before discussing embodiments of the present invention in further detail, it should be understood that a user may be caused to navigate to e-commerce enabled website 364, which in some embodiments can include a computerized application (e.g., a dedicated application associated with e-commerce enable website 364), any number of ways in order to purchase or otherwise procure item 362 in which the user is interested. For example, a user may browse the Internet, reading do-it-yourself (DIY) blog posts, watching DIY videos, and/or the like. The user may also access social media and news websites, and/or the like. In the real world, the user may see shows, movies, or commercial advertisements via a television and/or listen to programs or commercial advertisements via a radio. This exposure to many sources of web accessible media 366 may cause a user to want something or want to do something depicted in web accessible media 366. In some cases, online shopping through e-commerce website 364 may provide a quick and simple way to purchase or otherwise procure one or more items 362 to perform the wanted action. In some cases, "buy-it-now links" 368 may be provided on a DIY media page that permit the user to navigate directly to a webpage of an e-commerce enabled website selling item 362. In other cases, a user may learn he/she needs item 362 for a task (e.g., via television or radio) and search for item 362 independently (e.g., performing a search on a smart phone that leads the user to e-commerce website 364). For example, as shown in FIG. 3, after watching web accessible media 366 (e.g., a video depicting a cooking recipe), a user may navigate to e-commerce enabled website 364 to purchase item 362 (e.g., sugar) needed for the process (e.g., preparing a baked good) detailed in web accessible media 366. This is intended only as an example, and it should be understood that a user may navigate to e-commerce enabled website 364 or a computerized application associated with the same in any number of manners.

Referring further to FIG. 3 in connection with FIG. 2, procurement selection obtainer 252, as performed by computer system/server 12, obtains a selection of item 362 for procurement by the user through e-commerce enabled website 364. Once the user navigates to e-commerce enabled website 364, he/she may purchase or otherwise procure one or more items 362 using any checkout procedure now known or later developed. For example, e-commerce enabled website 364 can contain a payment portal at which the user enters his/her shipping and/or billing address and a payment method (e.g., credit card, e-check, electronic money transfer). Before (e.g., when item 362 is in a "cart"), during (e.g., at a time payment is initiated), or after (e.g., any time between purchase and when item 362 ships) this procurement/payment process, procurement selection obtainer 252 can access an account of the user at e-commerce enabled website 364 to discover any items 362 the user will purchase, is purchasing, or has purchased. In some embodiments, procurement selection obtainer 252 can obtain e-commerce website information about any particular item 362 the user enters into his/her cart or buys. In some other embodiments, procurement selection obtainer 252 can obtain e-commerce website information about a cart or final order of items 362 the user enters into his/her cart or buys. This e-commerce website information can include a time of purchase or selection, as well as information about one or more items 362.

Item identifier 254, as performed by computer system/server 12, identifies item 362, including a use for item 362. Item 362 can be identified any number of ways presently known or later developed. For example, item identifier 254 can use an identifier number (e.g., SKU code, product identifier, model number, etc.) to recognize item 362 and distinguish it from other items offered by e-commerce enabled website 364. In some embodiments, metadata tags can be associated with item 362 and/or the identifier number of item 362 and item identifier 254 can retrieve these metadata tags. The metadata tags can be used to associate one or more uses of item 362, activities using item 362, descriptions of item 362, and/or other properties of item 362 with the identified item 362. In the example depicted in FIG. 3, item 362, here a container of sugar, can have associated metadata tags such as "baking," "cooking," "desert," "treat," "candy," "cookies," "cake," "pie," "pastry," "tea," "coffee," "yummy," "delicious," "tasty," "scrumptious," "sweetener," "preservative," "moisture retainer," etc. According to some embodiments of the present invention, users of e-commerce enabled website 364 can add such metadata tags to item 362 and/or vote on these metadata tags. This voting can be used to crowd source a population of users to determine the most likely uses of item 362, permitting these uses to be ranked by popularity or frequency of use.

Media retriever 256, as performed by computer system/server 12, can retrieve web pointer 370 to web accessible media 366 provided by a third party source that describes the use for identified item 362. Web pointer 370 can be any link, URL, or other human or machine readable indicator of a location of web accessible media 366 in virtual space (e.g., the Internet). In some embodiments, media retriever 256 performs this task by searching one or more sources of media viewing history associated with the user and provided by a third party source. In some of these embodiments, media retriever 256 can search these sources according to a tiered closeness of the user viewing the media prior to the time of purchase or selection obtained by procurement selection obtainer 252.

In some embodiments, media retriever 256 can first review a webpage, provided by a party that is not affiliated with e-commerce enabled website 364, that the user was viewing immediately prior to navigating to e-commerce enabled website 364. In some embodiments, this webpage can be retrieved from a browsing history of the user. In still other embodiments, this webpage can be retrieved through a technique that permits detection by a web domain of an immediately previous website/webpage—that is to say the website/webpage that the user was visiting right before navigating to the web domain. Media retriever 256 can compare the content of the prior webpage against one or more of the metadata tags associated with item 362. This comparison can include comparison of text from the webpage against the metadata tags as well as extrapolation and object recognition of non-textual content, such as images, from pictures and/or video, for comparison against the tags. The comparison of text can include literal matching between the metadata tags and text from the webpage, as well as cognitive matching—cognitive computing enabled recognition of a word from the text or an extrapolated concept as related to one or more of the metadata tags. In some embodiments, media retriever 256 determines web accessible media 366 to be or potentially to be the context that caused the user to procure item 362. This determination can be based on a threshold relatedness of the metadata tags associated with item 362, the threshold being predetermined and the relatedness being determined by any method now known or later developed. For example, in some embodiments, media retriever 256 can make this determination if a sufficient number (e.g., any from one to all) of metadata tag matches are found within web accessible media 366. In another example, in some other embodiments, media retriever 256 can make this determination by weighting the metadata tag matches based on an assigned value from users/members of e-commerce enabled website 364 (e.g., users/members voting on popular uses of item 362) against the threshold.

Alternatively or additionally, in the case where the user navigated to e-commerce enabled website 364 using buy-it-now link 368, buy-it-now link 368 can be configured to include a tag with a back link to web accessible media 366 or to place a web cookie in the user's browsing session that media retriever 256 can use to access web accessible media 366. In the case media retriever 256 determines that buy-it-now link 368 was used to navigate to e-commerce enabled website 364, media retriever 256 can automatically identify the web accessible media appearing on the same page as buy-it now-link 368 as the context that caused the user to procure item 362, which therefore indicates the particular interest that the user has in item 362.

Alternatively or additionally, media retriever 256 can also review or cause to be reviewed a browsing history of the user. This browsing history may include the user's current browsing session prior to making the purchase. The browsing history may also include previous browsing sessions on one or more browsers running on a computer of the user. In some embodiments, this browsing history can also include a browsing history on a plurality of devices (e.g., a set of devices in an internet of things associated with the user). For example, in addition to history from a browser on a computer, the browsing history may include a watch history (e.g., on a TV or smart TV), a social media history (e.g., viewed posts), or a listening history (e.g., a playlist).

In some embodiments, media retriever 256 can perform the review of the browsing history in reverse chronological order from the time of purchase of item 362, as the user viewing the context that caused the user to procure item 362 is most likely to be close in time to the purchase. As described above with respect to reviewing an immediately prior web page, media retriever 256 can compare the web accessible media 366 content of each webpage in the browsing histories against one or more of the metadata tags associated with item 362. From this, media retriever 256 can determine which web accessible media 366 is or potentially is the context that caused the user to procure item 362 based on a threshold relatedness of the metadata tags associated with item 362 to web accessible media 366.

Additionally or in the alternative, in cases where multiple items 362 are being purchased or otherwise procured together, in some embodiments, media retriever 256 can cross-reference the metadata tags of each item 362 against one another to find a set of metadata tags that represent a common use for the multiple items 362 together. This set of in-common metadata tags can then be used to retrieve web accessible media 366. In some other embodiments, when there are multiple items 362 being purchased or otherwise procured together, media retriever 256 can cross-reference web accessible media 366 that media retriever 256 found for each particular item 362 to find web accessible media 366 that is or that potentially is the context that caused the user to procure items 362.

In some embodiments, media retriever 256 can transmit a message to a computer/device of the user or a program/application installed thereon to review the browsing history of the user on that computer/device. This message can contain one or more of the metadata tags and search instructions. These search instructions can instruct the computer/device or program/application to return a pointer (e.g., a URL) to any web accessible media 366 having content that meets or exceeds a threshold of relatedness to the metadata tags associated with item 362. This permits the privacy of the user to be maintained, as only content directly related to the purchase is returned to media retriever 256 and all other browsing history remains private.

In some embodiments, in cases where media retriever 256 fails to find web accessible media 366 that is or that potentially is the context that caused the user to procure item 362, media retriever 256 can search for publically accessible content from third party sources, based on the time of purchase or selection obtained by procurement selection obtainer 252, that the user may potentially have seen and therefore may have caused the user to procure item 362. For example, media retriever 256 can determine if a popular show or movie (e.g., a cooking show) aired or an advertisement was run a short time period (e.g., one hour) before the user made the purchase. Similar to the embodiment described above, media retriever 256 can compare the content of any publically accessible content against one or more of the metadata tags associated with item 362, determine which content is or potentially is the context that caused the user to procure item 362 based on a threshold relatedness of the metadata tags associated with item 362 to the content. Media retriever 256 can retrieve information concerning publically accessible content from the Internet, a public database, or any other source. Media retriever 256 can also reference information provided by a seller of item 362 and/or e-commerce enabled website 364 about when content related to item 362 is expected to air.

It should be understood that in various embodiments of the present invention, media retriever 256 can review web pages, the user's browsing history, and/or other content in any order and, in some embodiments, may not review each of these.

Additionally or in the alternative, media retriever 256 can identify web accessible media 366 that the user may not have visited, but that describe a usage of item 362 that is highly likely to be the intended usage for item 362 in which the user is interested. This can be accomplished by permitting users of e-commerce enabled website 364 to vote on popular usages of item 362 or webpages that the users feel best show usage of item 362. In another embodiment, media retriever 256 can be configured to learn and use previous successful (e.g., based on user feedback) identifications of web accessible media 366 from third party sources that provide purchase context to a user as the basis for identify web accessible media 366 that is highly likely to be the intended usage for item 362 in which the user is interested. Media retriever 256 could identify a top number of voted or learned usages and their associated web accessible media 366 as likely containing the instructions or other information in which the user is interested.

In some embodiments, media retriever 256 can be configured to retrieve links/pointers to a plurality of web accessible media 366. This can occur in instances in which media retriever 256 determines that several reviewed items of web accessible media 366 are each potentially the context that caused the user to procure item 362 due to each meeting or exceeding the threshold relatedness to the metadata tags associated with item 362. For example, with reference to the illustrative example shown in FIG. 3, suppose the user watched three different baking videos and read two baking recipes before navigating to e-commerce enabled website 364, where the user ordered sugar. Media retriever 256 could identify each of those sources of web accessible media 366 as potential context for the user's purchase of the sugar. Therefore, media retriever 256 could retrieve pointers to each of the five instances of web accessible media 366 so that system 250 can provide each to the user, allowing the user to have the context to remember in which of the media he/she is actually interested.

Notification generator 258, as performed by computer system/server 12, can generate a description 372 for web accessible media 366. Notification generator 258 can extract content from web accessible media 366 associated with each web pointer 370 retrieved by media retriever 256. To accomplish this, notification generator 258 can apply any data extraction technique now known or later developed to web accessible media 366. For example, notification generator 258 can be configured to extract audio (e.g., as a textual transcript) from a video (e.g., a streamed video on a streaming service) or audio file (e.g., a radio advertisement). In another example, notification generator 258 can be configured to apply object recognition technology to an image (e.g., a photo posted on social media) or video (e.g., text overlaying a playing video) to identify items shown therein (e.g., a shirt and jeans worn by a person in the posted picture). Notification generator 258 can also capture text or images from a webpage and/or web accessible media 366.

Furthermore, notification generator 258 can be configured to analyze the extracted content and distinguish portions of the extracted content that should be brought to the attention of the user. For example, notification generator 258 can isolate a set of instructions for the use of item 362 and/or a set of overall instructions for creating some thing or performing some task, of which item 362 or the use of item 362 is a component. As shown in FIG. 3, these distinguished portions of the extracted content of the baking video could be the steps of a recipe that calls for item 362, while other commentary (e.g., introduction of the chef preparing the recipe) from the video is omitted. In another example, notification generator 258 can limit identification of items shown in an image to only those that are commercially available (e.g., verified by a web search). In another example, notification generator 258 can identify items that are being used in conjunction with item 362 web accessible media 366 but which were not procured along with item 362.

From the extracted content and/or the distinguished extracted content of web accessible media 366, notification generator 258 can generate description 372 for web accessible media 366. Notification generator 258 can format the extracted content in a succinct format that is specifically configured for maximum usability in conjunction with item 362, the particular purchaser, and/or the like. Examples of this succinct format include, but are not limited to, a set of step by step instructions, captured images, information blurbs, and so forth. In some embodiments, generated description 372 can also include a title or other summation. Notification generator 258 can take this title from a title or header in web accessible media 366 or synthesize an appropriate title based on a cognitive analysis of the extracted content.

Notification generator 258, as performed by computer system/server 12, can further attach description 372 and/or web pointer 370 to procurement confirmation document 374. According to embodiments of the invention, procurement confirmation document 374 can be any electronic (e.g., email confirmation, electronic receipt, user order history on website) or physical (e.g., paper receipt, packing slip, shipping label) document that contains at least some information (e.g., price, item purchased, method of payment, vendor) about the user's procurement of item 362 from e-commerce enabled website 364. In some embodiments, procurement confirmation document 374 can be a physical document that is to be included in or on a shipping package containing item 362.

In some embodiments, notification generator 258 can incorporate description 372 and/or web pointer 370 into procurement confirmation document 374 and presented as a component of procurement confirmation document 374. For example, as shown in FIG. 3, description 372 and web pointer 370 can be printed on the bottom of a receipt included in a box in which item 362 is shipped to the user. Description 372 can be presented to the user in a human readable format, such as text and images. Web pointer 370 can be presented to the user in any of a human readable format (e.g., URL) or a machine readable format (e.g., hyperlink or QR code).

In some embodiments, additional content can be offered to a user on procurement confirmation document 374 in addition to or as an alternative to description 372 and/or web pointer 370. For example, in some embodiments, notification generator 258 can include offers (e.g., discounts) on items related to item 362 or its use based on the contextual data from web accessible media 366. In another example, notification generator 258 can include on document 374 an indication of the quantity of item 362 required to satisfy the instructions and, in the case more of item 362 was ordered than needed, suggestions for how to use the excess. These suggestions could also be optional instructions for other usages of item 362. In still another example, generator 258 can include on document 374 pointers (e.g., links) to any content determined to be related to item 362 or which e-commerce enabled website 364 directs should be included.

Notification generator 258, as performed by computer system/server 12, can further send procurement confirmation document 372 with attached description 372 and web pointer 370 to the user. In some embodiments, notification generator 258 can be configured to directly send procurement confirmation document 372 to the user via an electronic transmission, such as an email. In some other embodiments, notification generator 258 can be configured to cause procurement confirmation document 372 to be sent to the user. This may be accomplished, for example, by causing a physical copy of procurement confirmation document 372 to be printed or otherwise created for physical inclusion in or on a package containing item 362. Accordingly, again with reference to FIG. 3, when the user receives the package containing item 362 (e.g., via a postal service or other courier service) she need only look at the included receipt (procurement confirmation document 374) to be reminded that she wanted a container of baking sugar to be able to create the shortbread jam squares that she saw in an online video several days ago. Furthermore, even if the video is no longer available online or the user is otherwise unable to relocate the video, she has the recipe for the shortbread jam squares immediately available to her on the receipt.

Figure 4:
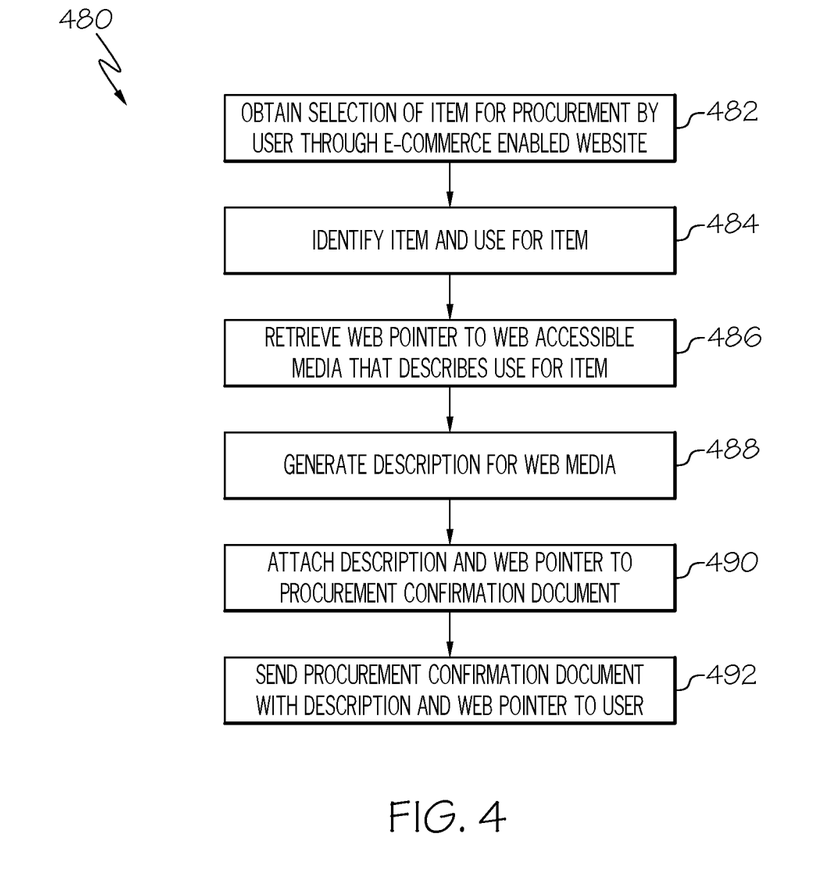
FIG. 4 shows a process flowchart for providing a user with a procurement context notification according to illustrative embodiments.

As depicted in FIG. 4, in one embodiment, a system (e.g., computer system/server 12) carries out the methodologies disclosed herein. Shown is a process flowchart 480 for providing a user with a procurement context notification. At 482, a selection of an item 362 for procurement by a user through an e-commerce enabled website 364 is obtained. At 484, the item 362 including a use for the item is identified. At 486, a web pointer 370 is retrieved to web accessible media 366 provided by a third party source that describes the use for the identified item 362. At 488, a description 372 is generated for the web accessible media 366. At 490, the description 372 and the web pointer 370 are attached to a procurement confirmation document 374. At 492, the procurement confirmation document 374 is sent with the attached description 372 and web pointer 370 to the user.

Process flowchart 480 of FIG. 4 illustrates the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices, or the like. A system or unit may also be implemented in software for execution by various types of processors. A system or unit or component of executable code may, for instance, comprise one or more physical or logical blocks of computer instructions, which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices. For instance, program/utility 40 may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Any of the components provided herein can be deployed, managed, serviced, etc., by a service provider that offers to deploy or integrate computing infrastructure with respect to a process for providing a user with a procurement context notification. Thus, embodiments herein disclose a process for supporting computer infrastructure, comprising integrating, hosting, maintaining, and deploying computer-readable code into a computing system (e.g., computer system/server 12), wherein the code in combination with the computing system is capable of performing the functions described herein.

In another embodiment, the invention provides a method that performs the process steps of the invention on a subscription, advertising, and/or fee basis. That is, a service provider, such as a Solution Integrator, can offer to create, maintain, support, etc., a process for providing a user with a procurement context notification. In this case, the service provider can create, maintain, support, etc., a computer infrastructure that performs the process steps of the invention for one or more customers. In return, the service provider can receive payment from the customer(s) under a subscription and/or fee agreement, and/or the service provider can receive payment from the sale of advertising content to one or more third parties.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is apparent that there has been provided herein approaches to provide a user with a procurement context notification. While the invention has been particularly shown and described in conjunction with exemplary embodiments, it will be appreciated that variations and modifications will occur to those skilled in the art. Therefore, it is to be understood that the appended claims are intended to cover all such modifications and changes that fall within the true spirit of the invention.

What is claimed is:

1. A method for providing a user with a procurement context notification, comprising:
   obtaining a selection of an item for procurement by a user through an e-commerce enabled website;
   identifying the item including a use for the item, the identifying the use for the item comprising:
      obtaining a set of metadata tags corresponding to at least one use of the identified item, the set of metadata tags being generated from historic user feedback;
      comparing the set of metadata tags to a browsing history of the user; and
      identifying web accessible media provided by a third party source as describing the use for the identified item based on an association with at least one tag of the set of metadata tags;
   retrieving a web pointer to the web accessible media provided by the third party source that describes the use for the identified item;
   generating a description for the web accessible media;
   attaching the description and the web pointer to a procurement confirmation document; and
   sending the procurement confirmation document with the attached description and web pointer to the user.

2. The method of claim 1, the retrieving further comprising:
   obtaining a history of a set of web accessible media browsed by the user prior to the procurement; and
   identifying at least one web accessible medium of the set of web accessible media that discuss the identified use for the item.

3. The method of claim 1, the identification of the at least one web accessible medium further comprising:
   communicating the set of metadata tags to a browser of the user for the comparison; and
   obtaining a pointer from the browser to the web accessible media only in the case that the association with the at least one tag of the set of metadata tags is above a threshold.

4. The method of claim 1, the method further comprising:
   transcribing the web accessible media from a non-textual first format to a textual second format; and
   generating the description for the web accessible media from the textual second format.

5. The method of claim 1, wherein the web accessible media comprises a set of instructions in which the item is used.

6. The method of claim 1, wherein the web accessible media is not initially associated with the e-commerce enabled website.

7. The method of claim 1, the sending further comprising generating a physical copy of the procurement confirmation document, including the attached description and web pointer, for inclusion with a physical package containing the item.

8. A computer system for providing a user with a procurement context notification, the computer system comprising:
   a memory medium comprising program instructions;
   a bus coupled to the memory medium; and
   a processor, for executing the program instructions, coupled to procurement context notification engine via the bus that when executing the program instructions causes the system to:
      obtain a selection of an item for procurement by a user through an e-commerce enabled website;
      identify the item including a use for the item, the identifying the use for the item comprising:
         obtaining a set of metadata tags corresponding to at least one use of the identified item, the set of metadata tags being generated from historic user feedback;
         comparing the set of metadata tags to a browsing history of the user; and
         identifying web accessible media provided by a third party source as describing the use for the identified item based on an association with at least one tag of the set of metadata tags;
      retrieve a web pointer to the web accessible media provided by the third party source that describes the use for the identified item;
      generate a description for the web accessible media;
      attach the description and the web pointer to a procurement confirmation document; and
      send the procurement confirmation document with the attached description and web pointer to the user.

9. The computer system of claim 8, the instructions further causing the system to:
   obtain a history of a set of web accessible media browsed by the user prior to the procurement; and
   identify at least one web accessible medium of the set of web accessible media that discuss the identified use for the item.

10. The computer system of claim 8, the instructions further causing the system to:
   communicate the set of metadata tags to a browser of the user for the comparison; and
   obtain a pointer from the browser to the web accessible media only in the case that the association with the at least one tag of the set of metadata tags is above a threshold.

11. The computer system of claim 8, the instructions further causing the system to:
   transcribe the web accessible media from a non-textual first format to a textual second format; and generate the description for the web accessible media from the textual second format.

12. The computer system of claim 8, wherein the web accessible media comprises a set of instructions in which the item is used.

13. The computer system of claim 8, wherein the web accessible media is not initially associated with the e-commerce enabled website.

14. The computer system of claim 8, the instructions further causing the system to generate a physical copy of the procurement confirmation document, including the attached description and web pointer, for inclusion with a physical package containing the item.

15. A computer program product for providing a user with a procurement context notification, the computer program product comprising a computer readable hardware storage device, and program instructions stored on the computer readable hardware storage device, to:
    obtain a selection of an item for procurement by a user through an e-commerce enabled website;
    identify the item including a use for the item, the identifying the use for the item comprising:
        obtaining a set of metadata tags corresponding to at least one use of the identified item, the set of metadata tags being generated from historic user feedback;
        comparing the set of metadata tags to a browsing history of the user; and
        identifying web accessible media provided by a third party source as describing the use for the identified item based on an association with at least one tag of the set of metadata tags;
    retrieve a web pointer to the web accessible media provided by the third party source that describes the use for the identified item;
    generate a description for the web accessible media;
    attach the description and the web pointer to a procurement confirmation document; and
    send the procurement confirmation document with the attached description and web pointer to the user.

16. The computer program product of claim 15, the computer readable storage device further comprising instructions to:
    obtain a history of a set of web accessible media browsed by the user prior to the procurement; and
    identify at least one web accessible medium of the set of web accessible media that discuss the identified use for the item.

17. The computer program product of claim 16, the computer readable storage device further comprising instructions to:
    communicate the set of metadata tags to a browser of the user for the comparison; and
    obtain a pointer from the browser to the web accessible media only in the case that the association with the at least one tag of the set of metadata tags is above a threshold.

18. The computer program product of claim 15, the computer readable storage device further comprising instructions to:
    transcribe the web accessible media from a non-textual first format to a textual second format; and
    generate the description for the web accessible media from the textual second format.

19. The computer program product of claim 15, wherein the web accessible media comprises a set of instructions in which the item is used and wherein the web accessible media is not initially associated with the e-commerce enabled website.

20. The computer program product of claim 15, the computer readable storage device further comprising instructions to generate a physical copy of the procurement confirmation document, including the attached description and web pointer, for inclusion with a physical package containing the item.

* * * * *